W. G. HANING.
DETACHABLE SAND TREAD FOR TIRES.
APPLICATION FILED JUNE 2, 1915.
1,208,149.
Patented Dec. 12, 1916.
2 SHEETS—SHEET 1.
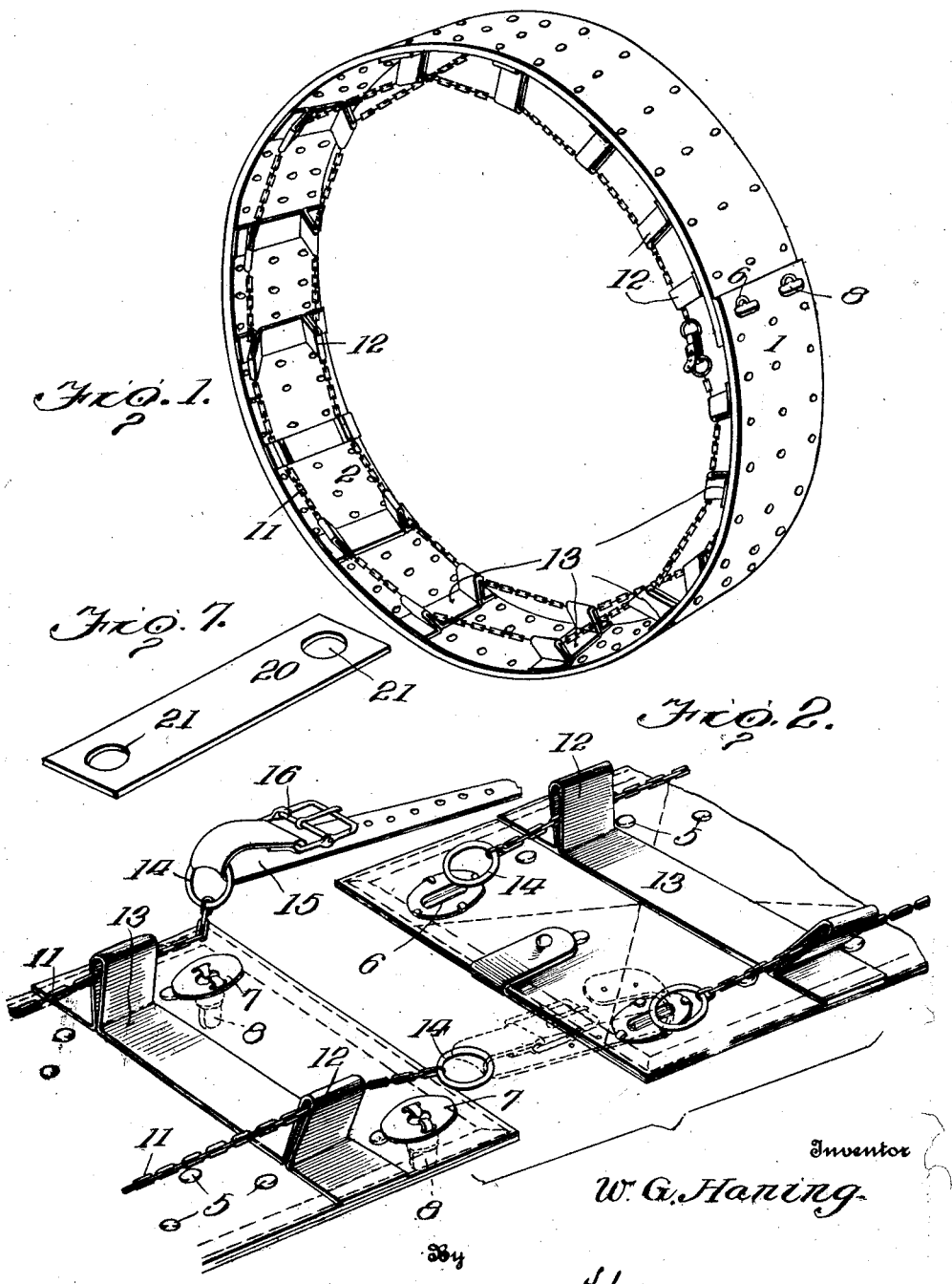
Inventor
W. G. Haning W. G. HANING.
DETACHABLE SAND TREAD FOR TIRES.
APPLICATION FILED JUNE 2, 1915.
1,208,149.
Patented Dec. 12, 1916.
2 SHEETS—SHEET 2.
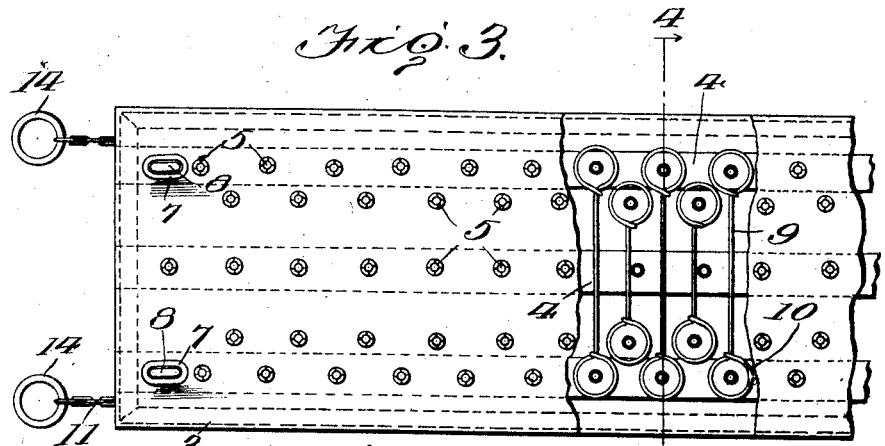
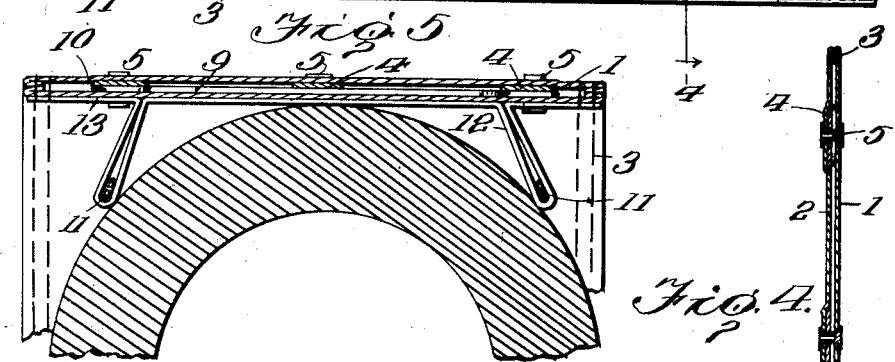
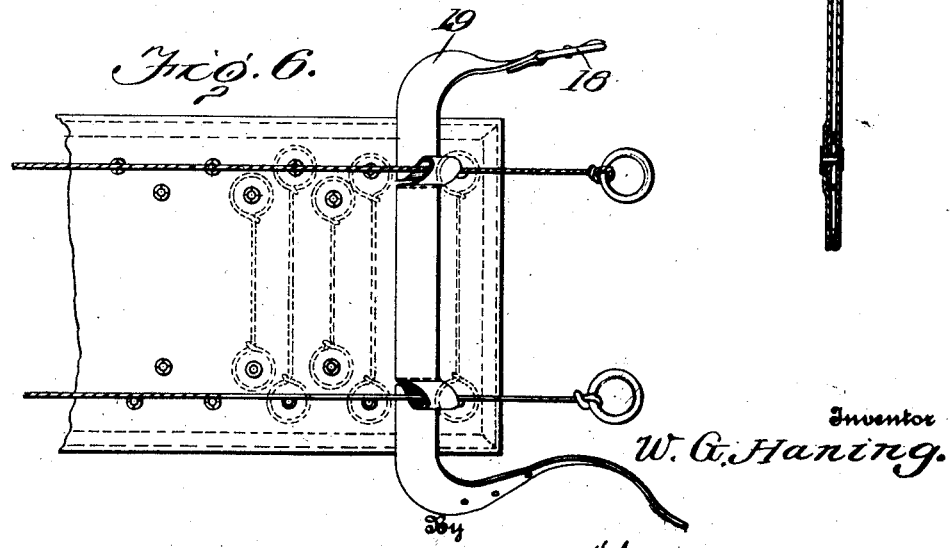
Inventor
W. G. Haning.

UNITED STATES PATENT OFFICE.

WILLIAM G. HANING, OF RIVERSIDE, CALIFORNIA.

DETACHABLE SAND-TREAD FOR TIRES.

1,208,149.  Specification of Letters Patent.  Patented Dec. 12, 1916.

Application filed June 2, 1915.  Serial No. 31,728.

*To all whom it may concern:*

Be it known that I, WILLIAM G. HANING, a citizen of the United States, residing at Riverside, in the county of Riverside and State of California, have invented certain new and useful Improvements in Detachable Sand-Treads for Tires, of which the following is a specification.

This invention relates to detachable sand treads for automobile tires and has as its object to provide a tread which may be readily applied to the tire and removed therefrom and which will be of such construction that, when in place upon the rear tires of an automobile, the same may be driven over sandy roads without danger of stalling and without the usual loss of traction due to slipping of the wheels.

Another aim of the invention is to provide a detachable tread of the class described which will effectually serve the purpose for which it is designed and yet will be flexible and of such construction as not to interfere with the ordinary passage of the wheels over ordinary road surfaces.

Another aim of the invention is to so construct the tread that it may be applied without the necessity of jacking up the machine.

In the accompanying drawings: Figure 1 is a perspective view of the tread embodying the present invention. Fig. 2 is a perspective view of the meeting ends of the tread band, illustrating the manner in which these ends are to be connected. Fig. 3 is a plan view of a portion of the tread, parts being broken away. Fig. 4 is a vertical transverse sectional view on the line 4—4 of Fig. 3. Fig. 5 is a transverse sectional view through the tread illustrating the manner in which the same is to be applied to a tire. Fig. 6 is a plan view illustrating a slight modification of the invention. Fig. 7 is a perspective view, illustrating a slightly modified form of resilient tread member.

Corresponding and like parts are referred to in the following description and indicated in all the views of the accompanying drawings by the same reference characters.

In the drawings, the body of the tread is in the form of a band, preferably composed of two superposed and united plies of heavy canvas or duck, these plies being indicated one by the numeral 1 and the other by the numeral 2. In uniting the plies to each other, rows of stitching 3 are run along the edges or margins of the plies and the plies are further united by other means, as will be presently explained. The band of the tread is of a length to fit circumferentially about the tire to which it is to be applied and is preferably of a width greater than the diameter of the tire. The band is reinforced longitudinally by a number of strips 4, preferably of leather, which are arranged between the plies 1 and 2 and extend parallel to each other and to the lateral edges of the said band. While the strips are here shown as three in number and as located one adjacent each lateral edge of the band and one medially of the band, a greater or less number of the strips may be employed if found desirable. The strips 4 are secured in place by means of tubular rivets 5 which are secured through the strips and through the plies 1 and 2 at suitable intervals, as clearly shown in Figs. 3 and 4 of the drawings, and these rivets may be employed either alone or in connection with suitable washers disposed against the outer surfaces of the plies.

In order that the ends of the tread band may be secured together in overlapped relation when the band is fitted about an automobile tire, the band at one end is provided with spaced metallic eyelets 6 which are secured in openings in the plies in any suitable manner and the openings of these eyelets are of greater length than width and extend parallel to the lateral edges of the band. Secured to the opposite end of the band by means of attaching portions 7 are buttons 8 which are adapted to have swivel movement and when the ends of the band have been brought together in overlapped relation, the buttons 8 are passed through the eyelets 6 and are then turned at right angles to the slots or openings of the eyelets and in this manner are prevented from accidental disengagement from the eyelets.

The tread embodies a number of resilient tread members which are arranged between the plies 1 and 2 and each of which is formed from a length of resilient wire, indicated at 9, bent at each end to form an annular eye 10, the extremities of the wire being bent about the wire so as to close the said eyes 10. All of the members 9 are of the same construction, but certain of the members are shorter than the others and the longer and shorter members are arranged alternately between the plies as clearly shown in Fig. 3 of the drawings and held in place by means of the tubular rivets 5 which are secured through the plies. The members 9 extend transversely of the plies and the longer ones of the said members have their eyes terminating at the outer ones of the reinforcing strips 4. The shorter ones of the tread members have their eyes terminating slightly short of said outer ones of the reinforcing strips.

The tread embodying the present invention is fastened about the tire to which it is applied by means of side chains, indicated by the numeral 11, which chains are passed through loops 12 formed near the ends of transverse straps 13 which are secured upon the inner face of the tread member, or more specifically, upon the outer face of the ply 2. The chains 11 are provided at their ends with rings 14 and the rings of each chain are connected by means of a strap 15 passed through the rings and secured by means of a buckle 16. While it is preferable that chains be employed, it may be desirable to employ a rope or leather straps or thongs, as shown in Fig. 6 of the drawings and indicated by the numeral 17, and in this latter form of the invention the tread is further secured in place by means of buckles 18 carried by extensions 19 of the straps 13, these extensions of the said straps being passed about the inner side of the felly of the wheel and secured by means of the said buckles 18.

If desired, one set, as for example, the shorter set, of the tread members 9 may be dispensed with, or, if found desirable, another and shorter set of these members may be employed, depending upon the weight of the car to the tires of which the treads are to be applied.

If desired, tread members of the form shown in Fig. 7 of the drawings and indicated by the numeral 20, may be employed in place of the resilient tread members 9. The members 20 are in the nature of flat sheet metal springs provided at their ends with eyes 21 through which the securing rivets 5 may pass, and, as in the case of the members 9 previously described, it is preferable that these members be formed in different lengths and arranged in the same manner as the said members 9.

By reference to Fig. 5 of the drawings, it will be observed that, when the tread is applied to the tire, the chains 11 will extend circumferentially at opposite sides of the tire tread, and the tread embodying the present invention will lie tangential to the transverse circumferential surface of the tire. In other words, the tread of the present invention will, when properly applied tend to maintain a cylindrical form, due to the resiliency of the tread members 9 or 20, as the case may be and, consequently, the wheel to the tire of which it is applied, will be prevented from sinking into the sand. It will further be apparent that, inasmuch as the distance between the lateral loops 12 is approximately one-half the diameter of the tire, slipping of the tire within the tread or slipping of the tread in a lateral direction is prevented.

Having thus described the invention, what is claimed as new is:

1. In a detachable tire tread of the class described, a flexible band, a plurality of resilient tread members carried thereby, straps extending transversely of the band and provided with loops spaced inwardly from the lateral edges of the band, and flexible securing elements passed through said loops and also located inwardly of the lateral edges of the band.

2. In a detachable tire tread of the class described, a flexible tread band comprising connected plies, resilient rectilinear tread members disposed between the plies and extending transversely thereof, reinforcing strips extending longitudinally between said plies, the said tread members being provided at their ends with eyes, and securing elements passing through the plies and through the eyes of the said members and also through the said strips.

In testimony whereof I affix my signature in presence of two witnesses.

WILLIAM G. HANING. [L. S.]

Witnesses:
 SARAH M. HANING,
 HARRY E. COURTNEY.